(12) United States Patent
Dubrouil (10) Patent No.: US 11,231,328 B2
(45) Date of Patent: Jan. 25, 2022

(54) METHOD AND ASSEMBLY FOR OPTICAL ANALYSIS OF AN ULTRASHORT LASER PULSE

(71) Applicant: FEMTO EASY, Pessac (FR)

(72) Inventor: Antoine Dubrouil, Talence (FR)

(73) Assignee: FEMTO EASY

( * ) Notice: Subject to any disclaimer, the term of this patent is extended or adjusted under 35 U.S.C. 154(b) by 0 days.

(21) Appl. No.: 16/753,357

(22) PCT Filed: Oct. 5, 2018

(86) PCT No.: PCT/FR2018/052460
§ 371 (c)(1),
(2) Date: Aug. 21, 2020

(87) PCT Pub. No.: WO2019/069037
PCT Pub. Date: Apr. 11, 2019

(65) Prior Publication Data
US 2020/0393305 A1    Dec. 17, 2020

(30) Foreign Application Priority Data

Oct. 6, 2017    (FR) ........................................ 1759391

(51) Int. Cl.
*G01J 11/00*    (2006.01)
*G01J 3/02*    (2006.01)
(Continued)

(52) U.S. Cl.
CPC ............. *G01J 11/00* (2013.01); *G01J 3/0224* (2013.01); *G01J 3/0227* (2013.01); *G01J 3/14* (2013.01); *G01J 3/2803* (2013.01); *G01J 3/2823* (2013.01)

(58) Field of Classification Search
CPC ............. G01J 11/00; G01J 3/0224; G01J 3/14
See application file for complete search history.

(56) References Cited

U.S. PATENT DOCUMENTS

| | | | |
|---|---|---|---|
| 6,504,612 B2* | 1/2003 | Trebino | G01J 11/00 356/450 |
| 7,570,851 B2* | 8/2009 | Weiner | G01J 11/00 356/491 |

FOREIGN PATENT DOCUMENTS

WO    2017037402    3/2017

OTHER PUBLICATIONS

M. Lelek, "Single-shot Spectral Interferometry Resolved in Time", 2006 (Year: 2006).*

(Continued)

*Primary Examiner* — Maurice C Smith
(74) *Attorney, Agent, or Firm* — Perman & Green, LLP (57) ABSTRACT

An optical analysis method and assembly for analysing an ultrashort laser pulse, the assembly includes a single-shot optical autocorrelator, having a polarity separator for angular separation of an incident laser radiation beam with fundamental frequency (ω) into two laser radiation beams with the fundamental frequency and linear polarities which are orthogonal to one another, the two beams forming angle therebetween so that the beams at least partially overlap at the output of the separator, a type-II nonlinear crystal receives the at least partially overlapping beams and generates, at the output of the crystal, a single laser radiation beam with harmonic frequency (2ω). A spectral filtering device selectively allows the passage of the single laser radiation beam while blocking the laser radiation beams with fundamental frequency. The non-linear crystal, spectral filtering device, and detection system detect an intensimetric single-shot autocorrelation trace of the order of two at the harmonic frequency.

12 Claims, 4 Drawing Sheets

(51) Int. Cl.
    *G01J 3/14*         (2006.01)
    *G01J 3/28*         (2006.01)

(56) References Cited

OTHER PUBLICATIONS

Ian A. Walmsley, et al; "Characterization of ultrashort electromagnetic pulses", Advances in Optics and Photon I CS, vol. 1., No. 2; Apr. 15, 2009, p. 308 and p. 352 last paragraph.
International Search Report issued in International Patent Application No. PCT/FR2018/052460 dated Jan. 22, 2019.

\* cited by examiner

METHOD AND ASSEMBLY FOR OPTICAL ANALYSIS OF AN ULTRASHORT LASER PULSE

CROSS-REFERENCE TO RELATED APPLICATIONS

This application is a National Stage of International Application No. PCT/FR2018/052460, having an International Filing Date of 5 Oct. 2018, which designated the United States of America, and which International Application was published under PCT Article 21(2) as WO Publication No. 2019/069037 A1, which claims priority from and the benefit of French Patent Application No. 1759391, filed on 6 Oct. 2017, the disclosures of which are incorporated herein by reference in their entireties.

BACKGROUND

1. Field

The present disclosure is in the general field of measuring ultrashort laser pulses.

It particularly relates to a single-shot optical autocorrelator device for analyzing an ultrashort laser pulse, i.e. a pulse having a duration in the picosecond to femtosecond range, in particular for measuring its duration or its temporal profile.

It also relates to an assembly and to a method for optically analyzing an ultrashort laser pulse implementing such a single-shot optical autocorrelator device.

2. Brief Description of Related Developments

Numerous applications of ultrashort laser pulses are known in the scientific, industrial and medical fields.

By way of an example, ultrashort laser pulses are used in the field of micro-machining (etching, drilling, marking, etc.), particularly in micro-electronics or in watchmaking.

These ultrashort laser pulses thus allow highly precise and burr-free etchings to be produced by virtue of the high instantaneous power delivered in each pulse.

In ophthalmic surgery, femtosecond lasers are implemented to remodel the corneal curvature of the eye by producing very precise cuts and without having a thermal effect on the cornea.

However, these applications necessitate being able to control both the amount of energy and the instantaneous power delivered by each laser pulse.

Therefore, significant research has been undertaken to develop devices for reliably and quickly characterizing ultrashort laser pulses in order to establish this control.

Figure 1:
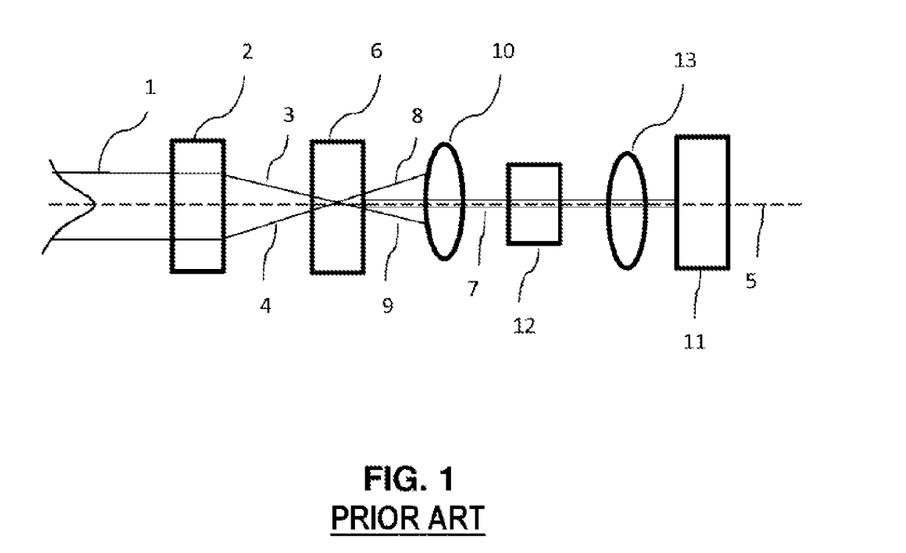
FIG. 1 is a schematic representation of a single-shot optical autocorrelator of the prior art.

FIG. 1 shows a single-shot autocorrelator of the prior art.

This autocorrelator advantageously allows an autocorrelation trace to be measured from a single ultrashort laser pulse, which allows the shape and the temporal width of the pulse to be characterized.

An incident laser beam 1 at a fundamental optical frequency ($\omega$) is sent to an optical splitter 2, which separates the incident laser beam 1 into two beams, called replicated beams 3, 4, with a fundamental optical frequency ($\omega$).

These two replicated beams 3, 4 propagate in different directions at the output of the optical splitter 2, with these two beams 3, 4 crossing at a non-zero angle $\alpha$ between them on the optical axis 5 of the incident laser beam 1.

A type-1 non-linear optical crystal 6, i.e. that allows a $2\omega$ radiation to be generated from two beams with the same polarity, placed at the intersection of the two replicated beams 3, 4, receives these two at least partially overlapping beams 3, 4, so that said beams non-linearly interact in this crystal 6 in order to produce beams 7-9 with optical frequency equal to twice ($2\omega$) the fundamental optical frequency ($\omega$) of the incident laser beam 1.

A spectral filter 10 disposed between the non-linear optical crystal 6 and an image detector 11, such as a CCD camera, allows blocking of the laser beams with fundamental optical frequency ($\omega$) that propagate in the directions of the replicated light beams 3, 4.

An image formation device 12, such as a lens, forms the image of the output face of the non-linear optical crystal 6 on this image detector 11. This image formation device 12 in this case has a magnification of one (1), but could have magnifications of more than one (1) in order to improve the resolution of the autocorrelator, this would nevertheless require moving the detector 11 even further away from the non-linear optical crystal 6.

At the output of the non-linear optical crystal 6 the following is consequently observed:
- an autocorrelation trace 7, also called second-order autocorrelation trace, of the frequency doubled incident laser beam 1 having an optical frequency ($2\omega$); and
- two beams 8, 9 with optical frequency equal to twice ($2\omega$) the fundamental optical frequency ($\omega$) of the incident laser beam 1, which beams, propagating in the directions of the replicated beams 3, 4, will be called "doubled lateral beams" hereafter.

Thus, and whilst the second-order autocorrelation trace 7 propagates along the optical axis 5 of the incident laser beam 1, the doubled lateral beams 8, 9 at the optical frequency $2\omega$ propagate laterally to this second-order autocorrelation trace 7 so that all the beams 7-9 at the frequency $2\omega$ are spatially separated.

In order to detect a second-order intensimetric autocorrelation trace, a spatial filter 13, such as an iris, needs to be placed at the focal point of the image formation device 12, with this spatial filter 13 only allowing passage of the central beam, or second-order autocorrelation trace 7, propagating along the propagation axis 5 of the incident laser pulse 1.

Thus, it can be seen that the implementation of an image formation device 12, optionally having a magnification of more than one (1), and of a spatial filter 13 make the assembly of a single-shot optical autocorrelator of the prior art bulky.

The optical appliances integrating such a single-shot optical autocorrelator of the prior art therefore require sufficient space, which is not always available.

Furthermore, such an assembly requires precise position adjustment and alignment of the various optical elements forming this single-shot optical autocorrelator.

These operations can be long and tedious for the operator.

Therefore, an urgent need exists for a new single-shot optical autocorrelator that allows the aforementioned disadvantages of the prior art to be overcome.

SUMMARY

The aim of the present disclosure is a single-shot optical autocorrelator device with a simple design and operating mode, which is compact and robust and which addresses the aforementioned disadvantages.

Another aim of the present disclosure is such a single-shot optical autocorrelator device having significantly less components to install and to align, and consequently having a reduced assembly time, whilst ensuring better mechanical stability thereof.

A further aim of the present disclosure is an economical and reliable method for analyzing an ultrashort laser pulse implementing such a single-shot optical autocorrelator device.

A still further aim of the present disclosure is such a method that particularly easily provides a FROG trace measurement, i.e. a spectrally resolved second-order autocorrelation trace.

To this end, the disclosure relates to a single-shot optical autocorrelator device for analyzing an ultrashort laser pulse.

According to the disclosure, this autocorrelator device is made up of:

a) a polarity separator for angularly separating an incident laser radiation beam with fundamental optical frequency ($\omega$) into two laser radiation beams with fundamental frequency ($\omega$) and linear polarities that are orthogonal to one another, said two beams forming an angle $\alpha$ between them at the output of said separator, said angle $\alpha$ being non-zero so that said beams at least partially overlap at the output of said separator;

b) a type-II non-linear crystal, i.e. that allows a $2\omega$ radiation to be generated from two beams with the same perpendicular polarity (doubling with a single polarity is impossible), said non-linear crystal being arranged to receive said at least partially overlapping beams originating from said separator so as to generate, at the output of said crystal, a single laser radiation beam with harmonic frequency ($2\omega$), which is a second-order autocorrelation trace having an optical frequency $2\omega$;

c) at least one spectral filtering device configured to selectively allow the passage of said laser radiation beam with harmonic frequency ($2\omega$), while blocking said laser radiation beams with fundamental frequency ($\omega$), said at least one filtering device being placed between said non-linear crystal and a spatially resolved detection system in at least one direction;

d) said non-linear crystal, said at least one spectral filtering device and said detection system being arranged to detect a second-order intensimetric type single-shot autocorrelation trace at the double optical frequency ($2\omega$).

This single-shot optical autocorrelator device is compact in that it is only made up of the aforementioned components a), b), c) and d), whilst ensuring fast, easy and precise measurement of the intensity autocorrelation function of an ultrashort laser pulse, such as a picosecond or femtosecond pulse.

The ultrashort laser pulse that is intended to be analyzed is linearly polarized at 45 degrees to the axes of the polarity separator in order to equally distribute the energy on each polarity axis. By default, a means for linearly polarizing the polarity of said pulse at 45 degrees to the axes of the polarity separator will be placed upstream of the autocorrelator device.

Advantageously, the generation of a second harmonic activated by cross-polarity by means of a type-II non-linear optical crystal allows a single laser radiation beam to be generated at the optical frequency ($2\omega$), which beam propagates along the optical axis of the incident laser beam and, consequently, dispenses with the laser radiation beams at the optical frequency ($2\omega$) propagating in the directions of the beams, called replicated beams, which are still referred to as "doubled lateral beams".

Thus, it is no longer necessary to have a spatial filter, such as an iris, for blocking the doubled lateral beams in order to detect a second-order intensimetric type single-shot autocorrelation trace at the double optical frequency ($2\omega$).

The measurement is significantly simplified and the interpretation of the curve that is obtained is direct since it is devoid of any interference. The background noise particularly caused by these two doubled lateral beams is dispensed with.

Such an optical assembly thus makes the single-shot optical autocorrelator device of the disclosure highly compact and simple. In particular, since it is devoid of an image formation device, such as a lens, it is particularly easy to align.

However, the lack of an image formation device requires an original design of the single-shot optical autocorrelator device in order to preserve the resolution thereof. This aim is achieved in this case by placing the detection plane as close as possible to the frequency conversion plane, i.e. the output face of the type-II non-linear crystal.

Advantageously, no alignment thus needs to be undertaken in the single-shot optical autocorrelator device and the ultrashort laser pulse to be analyzed simply needs to be introduced.

Solely by way of an illustration, this single-shot optical autocorrelator device can comprise a non-spatially resolved spectral filter, i.e. a spectral filter providing uniform filtering irrespective of the position of the beam on the filter, and a spatially resolved spectral filter, also called linearly variable spectral filter, with the non-spatially resolved spectral filter allowing at least partial absorption of the power of the laser radiation beam at the fundamental optical frequency ($\omega$).

The term "at the output of said separator" is understood to be at the output of or in the vicinity of the output face of the polarity separator.

The term "type-II non-linear crystal" is understood to be a crystal configured to generate a beam with a second harmonic ($2\omega$) from incident beams at the fundamental optical frequency ($\omega$) and at cross-polarities (o+e→e or o).

In various particular aspects of this single-shot optical autocorrelator device, each having its own advantages and being able to have numerous possible technical combinations:

said polarity separator is selected from the group comprising a Wollaston prism, a Babinet prism, a Rochon prism or other;

with said detection system having a detection plane, said non-linear crystal is at most placed at a distance d from said detection plane, with d being between ]0, 5] mm, preferably between ]0, 2] mm;

the thickness of said non-linear crystal is between 5 microns for a femtosecond pulse and around 500 microns for a picosecond pulse;

said single-shot optical autocorrelator device is a pre-assembled element, with at least said type-II non-linear crystal and said at least one spectral filtering device being in optical contact.

Advantageously, all the components of the single-shot optical autocorrelator device are thus pre-assembled together in order to form a single block making it easy to handle.

This single-shot optical autocorrelator device is thus ready to be mounted in an optical assembly without requiring alignment of its components and thus having better mechanical stability.

In this case, these components are assembled by bonding, but they could also be assembled by any other known means, and particularly by means of mechanical attachments, for example, by assembly on a plate or by means of rings.

It is to be noted that, by way of an alternative, the pre-assembled assembly could be limited to, or made up of, the polarity separator, the second-order non-linear crystal and said at least one spectral filtering device. This one-piece pre-assembled element thus would not directly integrate a spatially resolved detection system in at least one direction.

the assembly formed by said polarity separator, said type-II non-linear crystal and said at least one spectral filtering device is placed in an in-line, contiguous configuration.

This assembly advantageously allows the single-shot optical autocorrelator device to be very compact.

said or one of said spectral filtering device(s) has a recessed output face on at least one portion of its periphery.

Advantageously, it is thus possible for this output face of the spectral filtering device to be dimensioned and shaped to ensure that it fits into the casing, or body, of the detection system in order to place this output face of the spectral filtering device as close as possible to the detection module, such as a matrix of CCD or CMOS sensors, supported by the body of the detection system.

Solely by way of an illustration, the spectral filtering device is a multilayer filter or a colored glass filter.

said detection system comprises a matrix detector or even an imaging spectrometer, said imaging spectrometer comprising an inlet slit, a spectrally dispersive optical system and a spatially resolved two-dimensional detector.

Preferably, the matrix detector is a CCD or CMOS matrix detector having one- or two-dimensional micrometer resolution.

By way of an example, the spectrally dispersive optical system comprises a transmission or reflection diffraction grating.

Alternatively, with said or one of said spectral filtering device(s) being a linearly variable spectral filtering device, said detection system is configured to detect a FROG trace, also called spectrally resolved second-order single-shot autocorrelation trace.

The detection system advantageously is a matrix detector having two-dimensional micrometer resolution.

Such a spectral filtering device provides greater compactness whilst allowing operation with alignment of the optical assembly that is less critical than in the case of the imaging spectrometer.

The present disclosure also relates to an optical analysis assembly for analyzing an ultrashort laser pulse comprising a single-shot optical autocorrelator device as previously described.

According to one aspect of this analysis assembly, this assembly comprises an attenuator device and/or a polarizer for defining the polarity of the beam at the input of the autocorrelator device and/or an expander for increasing the diameter of the incident laser radiation beam.

The present disclosure also relates to a method for analyzing an ultrashort pulse implementing an optical analysis assembly as previously described.

According to the disclosure, the following steps are carried out:

producing a first laser radiation beam and a second laser radiation beam, said beams each having a fundamental optical frequency ($\omega$) and having linear polarities that are orthogonal to one another, said beams propagating while forming a non-zero angle between them;

introducing said at least partially overlapping first and second laser radiation beams into a type-II non-linear crystal, said crystal being configured to generate as output a single laser radiation beam with harmonic frequency ($2\omega$), which is a second-order autocorrelation trace having an optical frequency $2\omega$;

introducing the laser radiation beams exiting said non-linear crystal into at least one spectral filtering device, said at least one spectral filtering device being configured to selectively allow the passage of the laser radiation beam with harmonic frequency ($2\omega$), while blocking the laser radiation beams with fundamental frequency ($\omega$);

introducing the laser radiation beam with harmonic frequency ($2\omega$) into a spatially resolved detection system in at least one direction, said non-linear crystal, said at least one spectral filtering device and said detection system being arranged to detect a second-order intensimetric type single-shot autocorrelation trace at the double optical frequency ($2\omega$).

According to one aspect of the method of the disclosure, at the output of said non-linear crystal, said laser radiation beam with harmonic frequency ($2\omega$) is introduced into a linearly variable spectral filtering device, so that, after detection, a FROG trace, also called spectrally resolved second-order single-shot autocorrelation trace, is obtained.

Of course, this linearly variable spectral filtering device is adapted by resolution and by spectral range.

More broadly, the present disclosure also relates to a single-shot optical autocorrelator device for analyzing an ultrashort laser pulse.

According to the disclosure, this autocorrelator device comprises a linearly variable spectral filtering device and a spatially resolved two-dimensional matrix detector, said autocorrelator device being configured to provide a spectrally resolved single-shot autocorrelation trace of the order of more than one (1).

By way of an example, this spectrally resolved single-shot autocorrelation trace can be of the order of two (2) or of the order of three (3) or more.

The linearly variable spectral filtering device is placed directly in front of the matrix detector, in the direction of propagation of the incident laser beam.

With such a device, it is possible to measure an interferometric or intensimetric FROG trace. In this latter case, the single-shot optical autocorrelator device will also comprise a spatial filter.

Advantageously, this single-shot optical autocorrelator device comprises a separation means for separating an incident laser beam into two beams, called replicated beams with fundamental optical frequency ($\omega$), the two replicated beams forming a non-zero angle $\alpha$ between them, so that they at least partially overlap at the output of this separation means.

Preferably, this separation means can be configured to provide polarity or amplitude separation or even wavefront separation of the incident laser beam.

This single-shot optical autocorrelator device also comprises a non-linear crystal, which is arranged to receive the at least partially overlapping replicated beams originating from said separation means. The order of the non-linear crystal determines the order of the autocorrelation trace addressed on the assembly formed by the linearly variable spectral filtering device and the spatially resolved matrix detector along two axes or even in two-dimensions. It thus also determines the order of the FROG trace.

By way of an example, this non-linear crystal thus can be of the order of two (2) or three (3).

Such a single-shot optical autocorrelator device advantageously is highly sensitive, whilst being simple to use and compact, which makes it easy to transport.

It is also possible to remove the linearly variable spectral filter from the beam in order to measure an autocorrelation trace.

The present disclosure also relates to a single-shot optical autocorrelator device for analyzing an ultrashort laser pulse, said ultrashort laser pulse having a collimated wavefront and having a fundamental optical frequency ($\omega$).

According to the disclosure, this device is made up of:

a) a wavefront division optical component arranged to receive said collimated wavefront and to spatially split this collimated wavefront into a first split wavefront propagating in a first direction and a second split wavefront propagating in a second direction forming a non-zero angle with the first direction;

b) a type-I non-linear crystal, said non-linear crystal being arranged to receive said at least partially overlapping wavefronts originating from said wavefront splitting optical component, said type-I non-linear crystal having an output face;

c) at least one spectral filtering device placed between said type-I non-linear crystal and a spatially resolved detection system in at least one direction, said detection system having a detection plane; and d) the output face of said non-linear crystal being placed near the detection plane of the device but not coincident therewith, said non-linear crystal, said at least one spectral filtering device and said detection system being arranged to detect a second-order intensimetric type single-shot autocorrelation trace at the double optical frequency ($2\omega$).

With such a device, a second-order interferometric type single-shot autocorrelation trace is thus measured.

Preferably, at least said type-I non-linear crystal and said at least one spectral filtering device form a pre-assembled assembly. Advantageously, this pre-assembled assembly also contains the wavefront splitting optical component. It is thus possible to interchange this assembly with a pre-assembled assembly made up of the polarity separator, the type-II non-linear optical crystal and said at least one spectral filtering device, described above, in order to very easily obtain either a second-order interferometric type single-shot autocorrelation trace or a second-order intensimetric type single-shot autocorrelation trace.

Preferably, with said detection system having a detection plane, said non-linear crystal is at most placed at a distance d from said detection plane, with d being between ]0, 5] mm, i.e. d is between 0 excluded and 5 mm, and better still between ]0, 2] mm.

Advantageously, a signal processing system can be added to this autocorrelator device that is configured to analyze the second-order interferometric single-shot autocorrelation trace at the double optical frequency ($2\omega$) and to deduce therefrom a measurement of the duration, of the temporal profile and of the spectrum of the ultrashort laser pulse.

BRIEF DESCRIPTION OF THE DRAWINGS

Further advantages, aims and particular features of the present disclosure will become apparent from the following description, which is provided by means of a non-limiting explanation, with reference to the accompanying drawings, in which.

DETAILED DESCRIPTION

Firstly, it is to be noted that the figures are not to scale.

Figure 2:
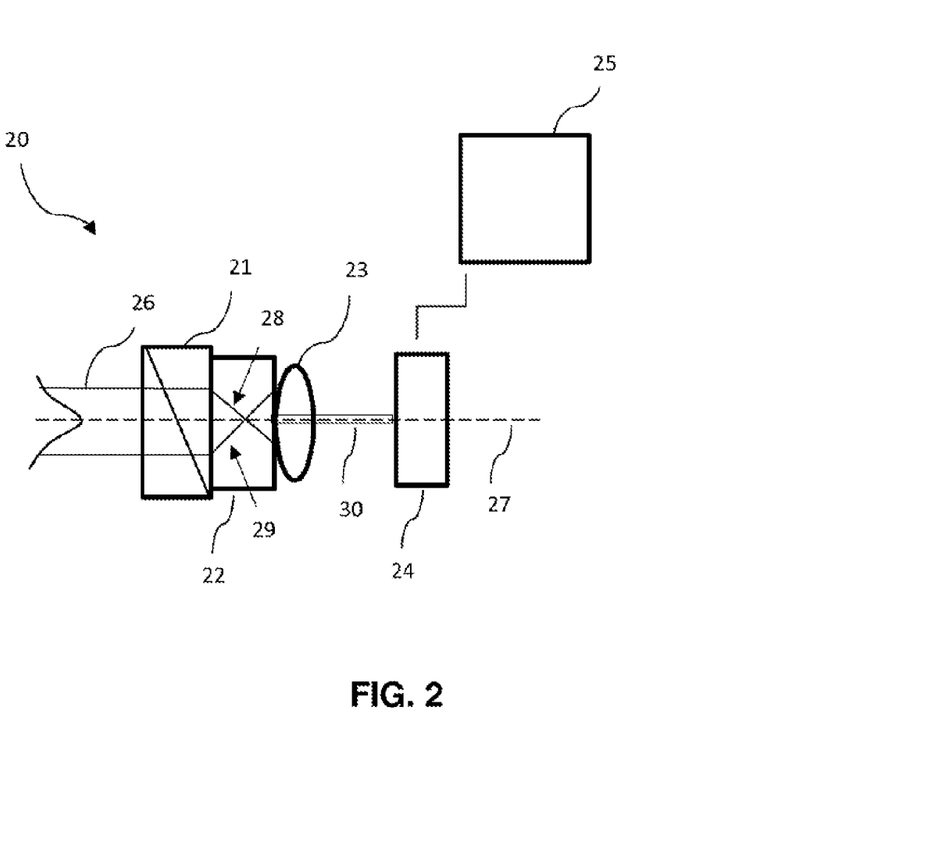
FIG. 2 schematically shows a single-shot optical autocorrelator device according to a first aspect of the present disclosure.
Figure 3:
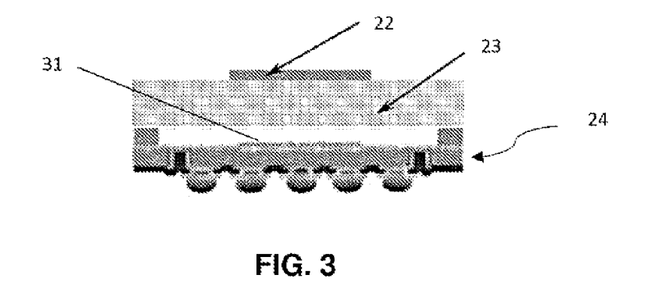
FIG. 3 is a partial and exploded view of the single-shot optical autocorrelator device of FIG. 2, showing the non-linear crystal, the spectral filtering device and the detector.

FIGS. 2 and 3 schematically show a single-shot optical autocorrelator device 20 according to a first aspect of the present disclosure.

This single-shot optical autocorrelator device 20 allows the duration of an ultrashort laser pulse to be measured on the basis of the detection of an intensimetric autocorrelation.

Hereafter, an ultrashort laser pulse with fundamental frequency ($\omega$) will be considered, such as a laser pulse generated by a femtosecond laser source.

This autocorrelator device 20 is made up of only the following components:

a polarity separator 21;
a non-linear crystal 22 allowing type-II phase matching;
a spectral filtering device 23; and
a detector 24 having a detection plane 31.

This detector 24 is advantageously connected to a processing unit 25 comprising a processor and, preferably, a display means, such as a screen, for displaying the data processed by said processing unit 25.

The elements of this autocorrelator device 20 are mounted in line whilst being accommodated in a casing. The assembly formed by the polarity separator 21, the type-II non-linear crystal 22 and the spectral filter 23 is contiguous. The detector 24 is advantageously placed in the immediate vicinity of the spectral filter 23, which makes the assembly highly compact. Furthermore, by thus placing the detection plane 31 as close as possible to the output face of the type-II non-linear crystal 22, it ensures that the resolution of the autocorrelator device is maintained.

The incident beam 26 advantageously has intensity distribution exhibiting axial symmetry relative to the optical axis 27 of propagation of this beam 26.

The polarity separator 21, which in this case is a Wollaston prism, receives the incident beam 26 and angularly separates this beam into two laser radiation beams 28, 29 with fundamental frequency ($\omega$) and with orthogonal linear polarities between them.

At the output of this separator 21, a first beam 28 propagates in a first direction that is inclined relative to the optical axis 27 of the incident beam 26 and a second beam 29 propagates in a second direction that is inclined relative to the optical axis 27 of the incident beam 26. The first and second directions are symmetrically inclined relative to the optical axis 27.

This polarity separator 21 in this case is configured so that the non-zero angle $\alpha$ formed between the two beams 28, 29 thus generated ensures the at least partial overlapping of these beams 28, 29 in the type-II non-linear optical crystal 22 that is contiguous with the output face of the polarity separator 21.

The beams 28, 29 thus generated are called the replicas of the incident beam 26, or even replicated beams.

This type-II non-linear crystal 22 is configured to ensure frequency doubling of the beam at the fundamental frequency $\omega$. This non-linear optical crystal 22 is, for example, a BBO crystal designed with a phase matching angle $\theta$=42.4°, which allows frequency doubling to be generated for a fundamental frequency $\omega$ corresponding to a wavelength $\lambda$ of 800 nm.

At the output of the type-II non-linear optical crystal 22 an autocorrelation trace of the frequency-doubled incident laser pulse is obtained, which is also called second-order autocorrelation trace with an optical frequency $2\omega$. This autocorrelation trace 30 propagates along the optical axis 27 of the incident beam 26.

With the two replicated beams 28, 29 at the fundamental optical frequency $\omega$ also being present at the output of the type-II non-linear optical crystal, a spectral filter 23 is placed between this type-II non-linear optical crystal 22 and the detector 24 to filter these two replicated beams and to only allow the passage of said laser radiation beam 30 with harmonic frequency ($2\omega$).

This spectral filter 23 in this case is contiguous with the output face of the type-II non-linear optical crystal 22. By way of an example, this spectral filter in this case is formed by a colored filter, such as a BG40 type colored glass.

The image detector 24 thus only receives the second-order autocorrelation trace propagating along the optical axis 27 of the incident laser beam 26, which allows a second-order intensimetric single-shot autocorrelation trace to be measured.

Advantageously, the detector 24 is a spatially resolved camera following two directions (X, Y) transverse to the optical axis 27. This camera preferably is a CCD or CMOS camera operating at a frequency of several ten to several hundred images per second. Of course, it is adapted as a function of the spectral range of the pulse to be measured.

The processing unit 25 connected to the detector 24 processes the second-order intensimetric autocorrelation measurements.

Figure 4:
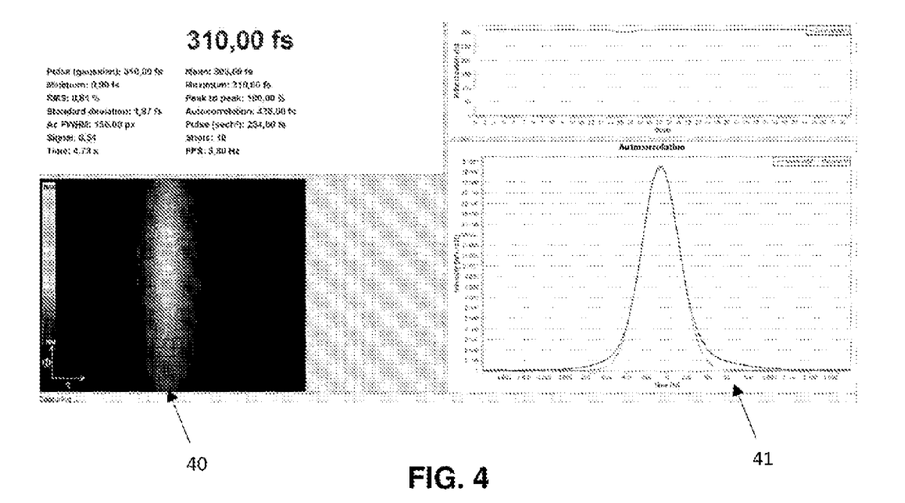
FIG. 4 is a screenshot showing an example of a measurement taken with the single-shot optical autocorrelator device of FIG. 2, with the left-hand side of this figure comprising a raw image of a spatially resolved second-order intensimetric single-shot autocorrelation trace and the right-hand side representing this autocorrelation trace after analysis.
Figure 5:
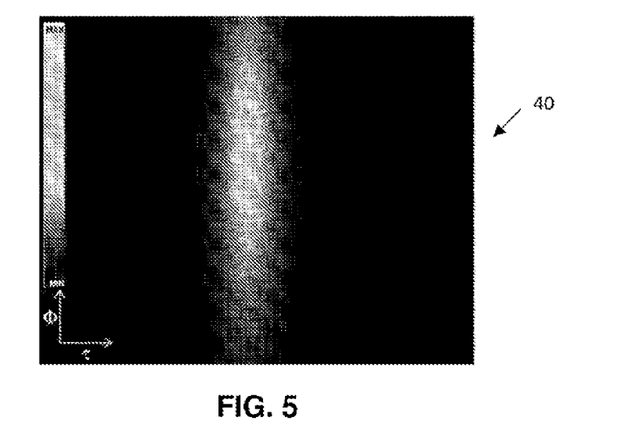
FIG. 5 is an exploded view of the raw image shown in FIG. 4.

FIGS. 4 and 5 show an example of a measurement taken with the single-shot optical autocorrelator device 20 illustrated in FIG. 2.

The image 40, shown on the left-hand side of FIG. 4 and as an exploded view in FIG. 5, is a raw image of a spatially resolved second-order intensimetric autocorrelation trace.

The abscissa axis represents the axis of time (t) and the ordinate axis represents the diameter (CD) of the measured incident laser beam. The incident laser beam has a Gaussian shape in its spatial dimension as well as in its temporal dimension.

The curve 41 shown on the right-hand side of FIG. 4 is a representation of the integration of the autocorrelation trace thus imaged over its entire diameter, with the abscissa axis representing the axis of time (t) and the ordinate axis representing the measured intensity.

On the basis of the curve 41 that is thus obtained, and following analysis, the duration of the incident laser pulse is determined, which in this case is 310 fs, for a "Gaussian duration".

Figure 6:
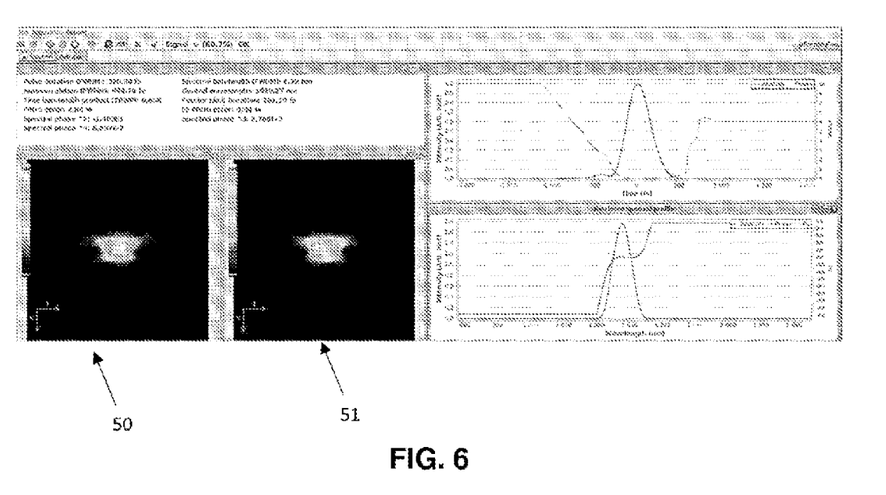
FIG. 6 is a screenshot showing an example of a measurement taken with a single-shot optical autocorrelator device according to a second aspect of the present disclosure, said autocorrelator device integrating a linearly variable spectral filtering device, the left-hand side of this figure comprising a raw image of a spatially resolved FROG trace, as well as an image of a FROG trace reconstructed by computations using an iterative algorithm, with the right-hand side of this figure representing various curves originating from the analysis of this FROG trace by means of the iterative algorithm.
Figure 7:
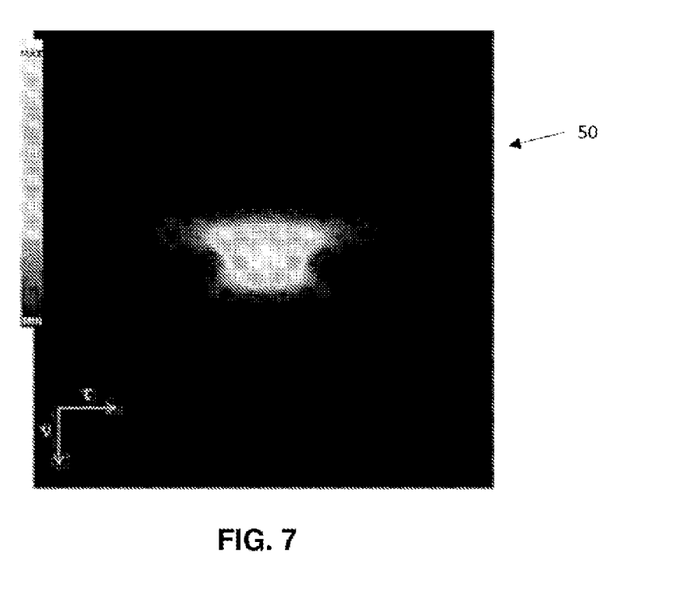
FIG. 7 is an exploded view of the raw image illustrated in FIG. 6.

FIGS. 6 and 7 illustrate an example of a FROG trace, or spectrally resolved second-order single-shot autocorrelation trace, obtained with an autocorrelator device comprising a linearly variable spectral filter.

FIG. 6 shows a screenshot obtained on the processing unit 25, with the left-hand side of this figure comprising a raw image 50 of a spatially resolved FROG trace, as well as a simulated image 51 of this FROG trace obtained by an iterative algorithm.

This iterative algorithm allows the physical parameters of the incident laser pulse to be determined, whilst ensuring the convergence of the simulated image 51 toward the experimentally acquired raw image 50.

Various curves are shown on the right-hand side of this FIG. 6 that originate from the analysis of this FROG trace by means of the iterative algorithm.

In FIG. 7, which is an exploded view of the raw image 50 of FIG. 6, the abscissa axis represents the axis of time (t) and the ordinate axis represents the spectral axis (wavelength A).

It can be seen that the linearly variable spectral filter has converted the spatial axis into a spectral axis. A specific wavelength is therefore transmitted as a function of the spatial position.

Such a FROG trace thus provides a time/spectrum map, which allows, via the iterative algorithm, the temporal profile of the pulse, the spectral phase and the fundamental spectrum (w) to be found.

Such information relating to the incident laser beam would not be accessible with an intensimetric single-shot autocorrelation trace.

The FROG trace allows the operator to determine the parameters required to reduce the duration of the pulse.

Figure 8:
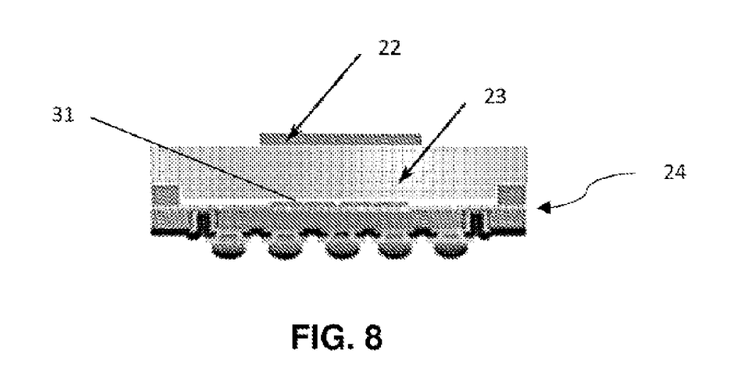
FIG. 8 illustrates a partial and exploded view of a single-shot optical autocorrelator device according to a second aspect of the disclosure, the spectral device having been designed to be placed as close as possible to the detection plane of the detector.

FIG. 8 is a partial and exploded view of a single-shot optical autocorrelator device according to a second aspect of the disclosure. The elements of FIG. 8 using the same reference signs as those of FIGS. 2 and 3 represent the same objects, which will not be described again hereafter.

The autocorrelator device of FIG. 8 differs from that shown in FIGS. 2 and 3 in that the output face of the spectral device 23 has been designed to place said device as close as possible to the detection plane 31 of the detector 24.

However, this output face of the spectral filtering device 23 is not placed directly in contact with this detection plane 31, in this case formed by the external surface of the detection module, to prevent any damage thereto. In this case, the spectral filtering device 23 replaces the protection window of the detection device (CMOS or CCD sensor). With the window forming part of the one-piece manufacture of this type of sensor, a method for removing the window without damaging the sensor has been developed.

Figure 9:
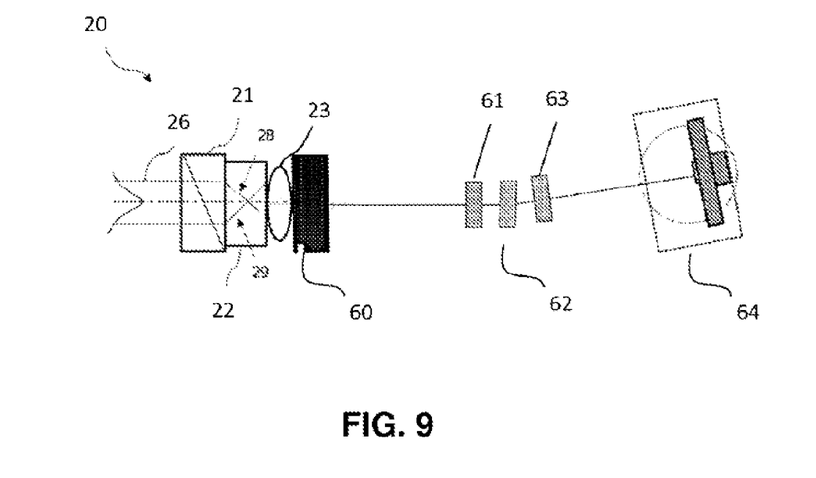
FIG. 9 schematically shows a single-shot optical autocorrelator device according to a third aspect of the disclosure, said device being equipped with an imaging spectrometer.

FIG. 9 schematically shows a single-shot optical autocorrelator device equipped with an imaging spectrometer. The elements of FIG. 9 using the same reference signs as those of FIGS. 2 and 3 represent the same objects, which will not be described again hereafter.

This imaging spectrometer comprises an inlet slit 60, a first lens 61, a spectrally dispersive optical system 62, a second lens 63 and a spatially resolved two-dimensional detector 64.

By way of an example, the spectrally dispersive optical system 62 comprises a transmission diffraction grating.

The output face of the type-II non-linear crystal 22 is advantageously placed in the immediate vicinity of the inlet slit 60 of the imaging spectrometer.

What is claimed is:

1. A single-shot optical autocorrelator device for analyzing an ultrashort laser pulse, the single-shot optical autocorrelator device comprising:
    a polarity separator for angularly separating an incident laser radiation beam with a fundamental optical frequency ($\omega$) into two laser radiation beams with the fundamental frequency ($\omega$) and linear polarities that are orthogonal to one another, said two beams forming an angle between them at the output of said separator, said angle being non-zero so that said beams at least partially overlap at the output of said separator;
    a type-II non-linear crystal, said non-linear crystal being arranged to receive said at least partially overlapping beams originating from said separator so as to generate, at the output of said crystal, a single laser radiation beam with a harmonic frequency ($2\omega$), which is a second-order autocorrelation trace having an double optical frequency $2\omega$;
    at least one spectral filtering device configured to selectively allow the passage of said laser radiation beam with the harmonic frequency ($2\omega$), while blocking said laser radiation beams with the fundamental frequency ($\omega$), said at least one filtering device being placed between said non-linear crystal and a spatially resolved detection system in at least one direction;
    said non-linear crystal, said at least one spectral filtering device, and said detection system being arranged to detect a second-order intensimetric type single-shot autocorrelation trace at the double optical frequency $2\omega$.

2. The single-shot optical autocorrelator device as claimed in claim 1, wherein said polarity separator is selected from the group comprising a Wollaston prism, a Babinet prism, and a Rochon prism.

3. The single-shot optical autocorrelator device as claimed in claim 1, wherein with said detection system having a detection plane, said non-linear crystal is at most placed at a distance between ]0, 5] mm from this detection plane.

4. The single-shot optical autocorrelator device as claimed in claim 1, wherein said single-shot optical autocorrelator device is a pre-assembled element, with at least said type-II non-linear crystal and said at least one spectral filtering device being in optical contact.

5. The single-shot optical autocorrelator device as claimed in claim 1, wherein the assembly formed by said polarity separator, said type-II non-linear crystal, and said at least one spectral filtering device is placed in an in-line, contiguous configuration.

6. The single-shot optical autocorrelator device as claimed in claim 1, wherein said at least one spectral filtering device has a recessed output face on at least one portion of its periphery.

7. The single-shot optical autocorrelator device as claimed in claim 1, wherein said detection system comprises a matrix detector or an imaging spectrometer, said imaging spectrometer comprising an inlet slit, a spectrally dispersive optical system, and a spatially resolved two-dimensional detector.

8. The single-shot optical autocorrelator device as claimed in claim 1, wherein the at least one spectral filtering device is a linearly variable spectral filtering device, said spatially resolved detection system being configured to detect a FROG trace, also called spectrally resolved second-order single-shot autocorrelation trace.

9. An optical analysis assembly for analyzing an ultrashort laser pulse, characterized in that it comprises a single-shot optical autocorrelator device as claimed in claim 1.

10. The optical analysis assembly as claimed in claim 9, further comprising one or more of an attenuator device, a polarizer, and an expander for increasing the diameter of the incident laser radiation beam.

11. A method for analyzing an ultrashort pulse implementing an optical analysis assembly as claimed in claim 9, the method comprising the following steps:
    producing a first laser radiation beam and a second laser radiation beam, said beams having a fundamental optical frequency ($\omega$) and having linear polarities that are orthogonal to one another, said beams propagating while forming a non-zero angle between them;
    introducing said at least partially overlapping first and second laser radiation beams into a type-II non-linear crystal, said crystal being configured to generate as output the single laser radiation beam with harmonic frequency ($2\omega$), which is the second-order autocorrelation trace having the double optical frequency $2\omega$;
    introducing the laser radiation beams exiting the non-linear crystal into the at least one spectral filtering device, said at least one filtering device being configured to selectively allow the passage of the laser radiation beam with harmonic frequency ($2\omega$), while blocking the laser radiation beams with fundamental frequency ($\omega$);
    introducing the laser radiation beam with harmonic frequency ($2\omega$) into the spatially resolved detection system in at least one direction, said non-linear crystal, said at least one spectral filtering device, and said spatially resolved detection system being arranged to detect the second-order intensimetric type single-shot autocorrelation trace at the double optical frequency ($2\omega$).

12. The method as claimed in claim 11, wherein the at least one spectral filtering device is a linearly variable spectral filtering device and at the output of said non-linear crystal, said laser radiation beam with the harmonic frequency ($2\omega$) is introduced into the linearly variable spectral filtering device, so that, after detection, a FROG trace, also called spectrally resolved second-order single-shot autocorrelation trace, is obtained.

* * * * *